(12) United States Patent
Spica (10) Patent No.: US 12,474,406 B2
(45) Date of Patent: Nov. 18, 2025

(54) SYSTEM ACCESS BOUNDARY SCAN VIA SYSTEM SIDEBAND SIGNAL CONNECTIONS

(71) Applicant: Micron Technology, Inc., Boise, ID (US)

(72) Inventor: Michael Richard Spica, Eagle, ID (US)

(73) Assignee: Micron Technology, Inc., Boise, ID (US)

(*) Notice: Subject to any disclaimer, the term of this patent is extended or adjusted under 35 U.S.C. 154(b) by 95 days.

(21) Appl. No.: 18/583,282

(22) Filed: Feb. 21, 2024

(65) Prior Publication Data

US 2024/0288497 A1 Aug. 29, 2024

Related U.S. Application Data

(60) Provisional application No. 63/448,148, filed on Feb. 24, 2023.

(51) Int. Cl.
*G01R 31/3185* (2006.01)
*G01R 31/28* (2006.01)
*G01R 31/317* (2006.01)

(52) U.S. Cl.
CPC . *G01R 31/318597* (2013.01); *G01R 31/2834* (2013.01); *G01R 31/31713* (2013.01)

(58) Field of Classification Search
None
See application file for complete search history.

(56) References Cited

PUBLICATIONS

Eklow, Bill, "IEEE P1149 6 A Boundary Scan Standard for Advanced Digital Networks", ITC international test conference 2002, (Oct. 2022), 10 pages.

*Primary Examiner* — Guerrier Merant
(74) *Attorney, Agent, or Firm* — Schwegman Lundberg & Woessner, P.A.

(57) ABSTRACT

A method performed by automated test equipment (ATE) includes power cycling a solid state drive (SSD) device under test by the ATE, wherein the SSD device includes a memory controller integrated circuit (IC) attached to a printed circuit board (PCB) having a PCB interface; communicating one or more signals between the ATE and the memory controller IC using the PCB interface in a normal system mode; sending a command to cause the memory controller IC to place the PCB interface in a boundary scan mode; remapping a portion of pins of the PCB interface to a boundary scan interface; and communicating one or more boundary scan signals between the ATE and the memory controller IC using the remapped portion of pins of the PCB interface in the boundary scan mode.

20 Claims, 5 Drawing Sheets

SYSTEM ACCESS BOUNDARY SCAN VIA SYSTEM SIDEBAND SIGNAL CONNECTIONS

PRIORITY APPLICATION

This application claims the benefit of priority to U.S. Provisional Application Ser. No. 63/448,148, filed Feb. 24, 2023, which is incorporated herein by reference in its entirety.

TECHNICAL FIELD

Embodiments of the disclosure relate generally to memory devices and more specifically to systems and methods to test the memory devices for defects.

BACKGROUND

Memory devices for computers or other electronic devices may be categorized as volatile and non-volatile memory. Volatile memory requires power to maintain its data, and includes random-access memory (RAM), dynamic random-access memory (DRAM), or synchronous dynamic random-access memory (SDRAM), among others. Non-volatile memory can retain stored data when not powered, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others. Persistent memory is a type of non-volatile memory that is characterized as byte addressable low latency memory. Examples of persistent memory may include Non-volatile Dynamic Inline Memory Modules (NVDIMM), phase-change memory, storage class memory, and the like.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, various embodiments discussed in the present document.

DETAILED DESCRIPTION

Embodiments of the present disclosure are directed to testing of memory devices that have Solid State Drive (SSD) form factors, Peripheral Component Interconnect Special Interest Group (PCI-SIG) form factors, and Storage Networking Industry Association (SNIA) form factors. Currently, most memory devices with these form factors do not include pins or pads assigned for boundary scan (e.g., boundary scan testing according to the IEEE 1149.1-15 standards).

Memory devices can include arrays of memory cells. Managed memory devices can include a memory controller to control or manage access to memory arrays typically formed of multiple individual memory die and operated according to memory management protocols. The memory management protocols may be in accordance with an established industry standard operation.

An SSD is a memory device that can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

SSDs can include a number of integrated circuit (IC) dies or logical units (e.g., logical unit numbers or LUNs), and can include one or more processors or other memory controllers performing logic functions required to operate the memory devices or interface with external systems. SSDs can include one or more flash memory die, including a number of memory arrays and peripheral circuitry thereon. The flash memory arrays can include a number of blocks of memory cells organized into a number of physical pages. In some examples, the SSDs can also include DRAM or SRAM (or other forms of memory die or other memory structures). SSDs can receive commands from a host device in association with memory operations, such as read or write operations to transfer data (e.g., user data and associated integrity data, such as error data and address data, etc.) between the memory devices and the host, or erase operations to erase data from the memory devices.

SSDs may be packaged in a conventional form factor. Some examples of a conventional form factor include an M.2 form factor, a U.2 form factor, a U.3 form factor, and an enterprise and data center standard form factor (EDSFF). The form factor can define the SSD dimensions and one or more of the SSD interface, protocol, connector specifications, and mechanical and electrical specifications of the SSD.

Boundary scan testing involves adding a scan chain to the design of the memory devices. The scan chain provides test circuitry to the input-output (I/O) ports of an integrated circuit (IC) die that allows test data to be loaded serially into the I/O ports via a Test Access Port (TAP) using Joint Test Action Group (JTAG) protocol operations. The scan chain may serially connect or 'chain' multiple active devices together so that a small number of pins (e.g., 4 or 5 pins for a JTAG implementation) can be manipulated by an In Circuit Test (ICT) system to perform printed circuit board (PCB) level testing without functional operation of the electronic device under test. This allows the connections between components to be evaluated for issues after placement on the PCB. However, the conventional form factors for SSDs do not support boundary scan as the pins required for boundary scan are not available for access by automated test equipment (ATE).

Figure 1:
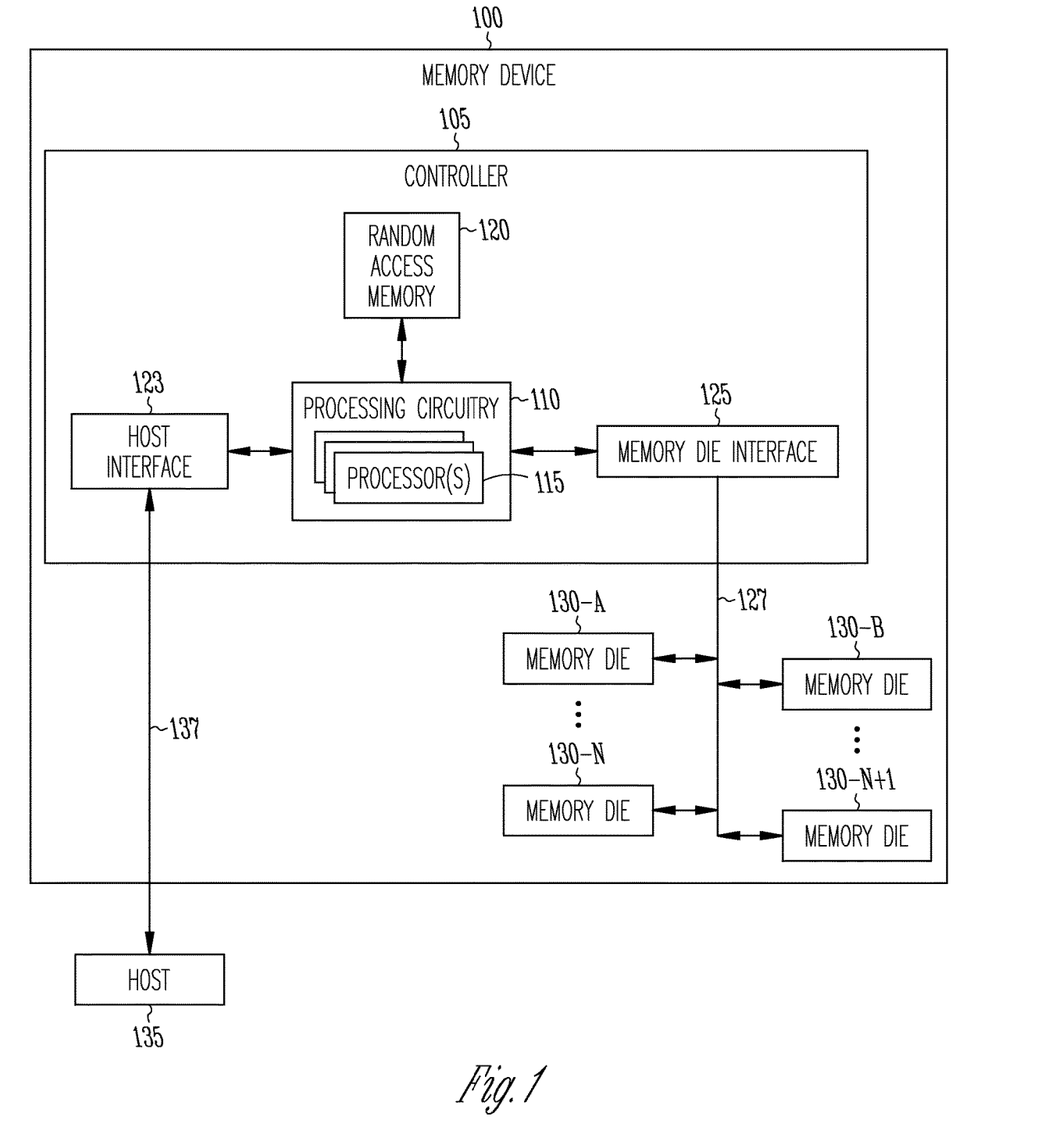
FIG. 1 illustrates an example system including a host device and a memory device according to some examples described herein.

FIG. 1 shows an example of an environment including a host device 135 and a memory device 100 configured to communicate over a communication interface 137. The host device 135 or the memory device 100 may be included in a variety of products, such as Internet of Things (IoT) devices (e.g., a refrigerator or other appliance, sensor, motor or actuator, mobile communication device, automobile, drone, etc.) to support processing, communications, or control of the product.

The memory device 100 includes a memory controller 105 and a memory array including, for example, memory cells included in a number of individual memory die (130-A, 130-B . . . 130-N). In an example, the memory device 100 may be an SSD component of the host device 135. In some examples, the memory device 100 communicates with host device 135 components via a host interface 123. Thus, as described herein, a host, or host device 135 operation is distinct from those of the memory device 100, even when the memory device 100 may be integrated into the host device 135.

Various forms of communication interfaces may be used to transfer data between the memory device 100 and one or more other components of the host device 135, such as a Serial Advanced Technology Attachment (SATA) interface, a Peripheral Component Interconnect Express (PCIe) interface, a Universal Serial Bus (USB) interface, compute express link (CXL) interface, a Universal Flash Storage (UFS) interface, an eMMC™ interface, or one or more other connectors or interfaces. The host device 135 may include a host system, an electronic device, a processor, a memory card reader, or one or more other electronic devices external to the memory device 100. In some examples, the host 135 may be a machine having some portion, or all, of the components discussed in reference to the machine 500 of FIG. 5.

The memory controller 105 may receive instructions from the host 135, and may communicate with the memory array, such as to transfer data to (e.g., write) or from (e.g., read), or to erase one or more of the memory cells, planes, sub-blocks, blocks, or pages of the memory array. For example, the memory controller 105 includes processing circuitry 110, which may include one or more processors which, when present, operate to execute instructions stored in the memory device 100. For purposes of the present examples, the instructions will be discussed as firmware, though instructions may also be present as software; and all or some portion of the described functions may also be implemented in circuitry including one or more components or integrated circuits.

For example, the memory controller 115 may include one or more memory control units, circuits, or components configured to control access across the memory array and to provide a translation layer between the host 135 and the memory device 100. Additionally, the memory controller 105 may include a memory die interface 125 to interface with the memory die on memory bus 127. In some examples, the memory die interface 125 may an Open NAND Flash Interface (ONFI).

For purposes of the present description, example memory operation and management functions will be described in the context of NAND memory. Persons skilled in the art will recognize, upon reading this detailed description, that other forms of non-volatile memory may have analogous memory operations or management functions. The memory array may include several memory cells arranged in, for example, devices, planes, sub-blocks, blocks, or pages. As one example, a 48 gigabyte (GB) Triple Level Cell (TLC) NAND memory device may include 18,592 bytes of data per page (16,384+2208 bytes), 1536 pages per block, 548 blocks per plane, and 4 or more planes per device. As another example, a 32 GB Multi-Level Cell (MLC) memory device (storing two bits of data per cell (i.e., 4 programmable states)) may include 18,592 bytes of data per page (16,384+ 2208 bytes), 1024 pages per block, 548 blocks per plane, and 4 planes per device, but with half the required write time and twice the program/erase (P/E) cycles as a corresponding TLC memory device. Other examples may include other numbers or arrangements. In some examples, the memory device 100, or a portion thereof, may be selectively operated in Single Layer Cell (SLC) mode, or in a desired MLC mode (such as TLC, Quad-Layer Cell (QLC), etc.).

In operation, data is typically written to or read from the memory device 100 in pages and erased in blocks. However, one or more memory operations (e.g., read, write, erase, etc.) may be performed on larger or smaller groups of memory cells, as desired. The data transfer size of a NAND memory device is typically referred to as a page, whereas the data transfer size of a host 135 is typically referred to as a sector. In some examples, the memory array may comprise a number of NAND dies and one or more functions of the memory controller 105 for a particular NAND die may be implemented on an on-die controller on that particular die. Other organizations and delineations of control functionality may also be utilized, such as a controller for each die, plane, superblock, block, page, and the like.

Although a page of data may include a number of bytes of user data (e.g., a data payload including a number of sectors of data) and its corresponding metadata, the size of the page often refers only to the number of bytes used to store the user data. As an example, a page of data having a page size of 4 kilobytes (KB) may include 4 KB of user data (e.g., 8 sectors assuming a sector size of 512 bytes (B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays may provide for different page sizes or may require different amounts of metadata associated therewith. For example, different memory device types may have different bit error rates, which may lead to different amounts of metadata necessary to ensure integrity of the page of data (e.g., a memory device with a higher bit error rate may require more bytes of error correction code data than a memory device with a lower bit error rate). As an example, an MLC NAND flash device may have a higher bit error rate than a corresponding SLC NAND flash device. This means that the MLC device may require more metadata bytes for error data than the corresponding SLC device.

Figure 2:
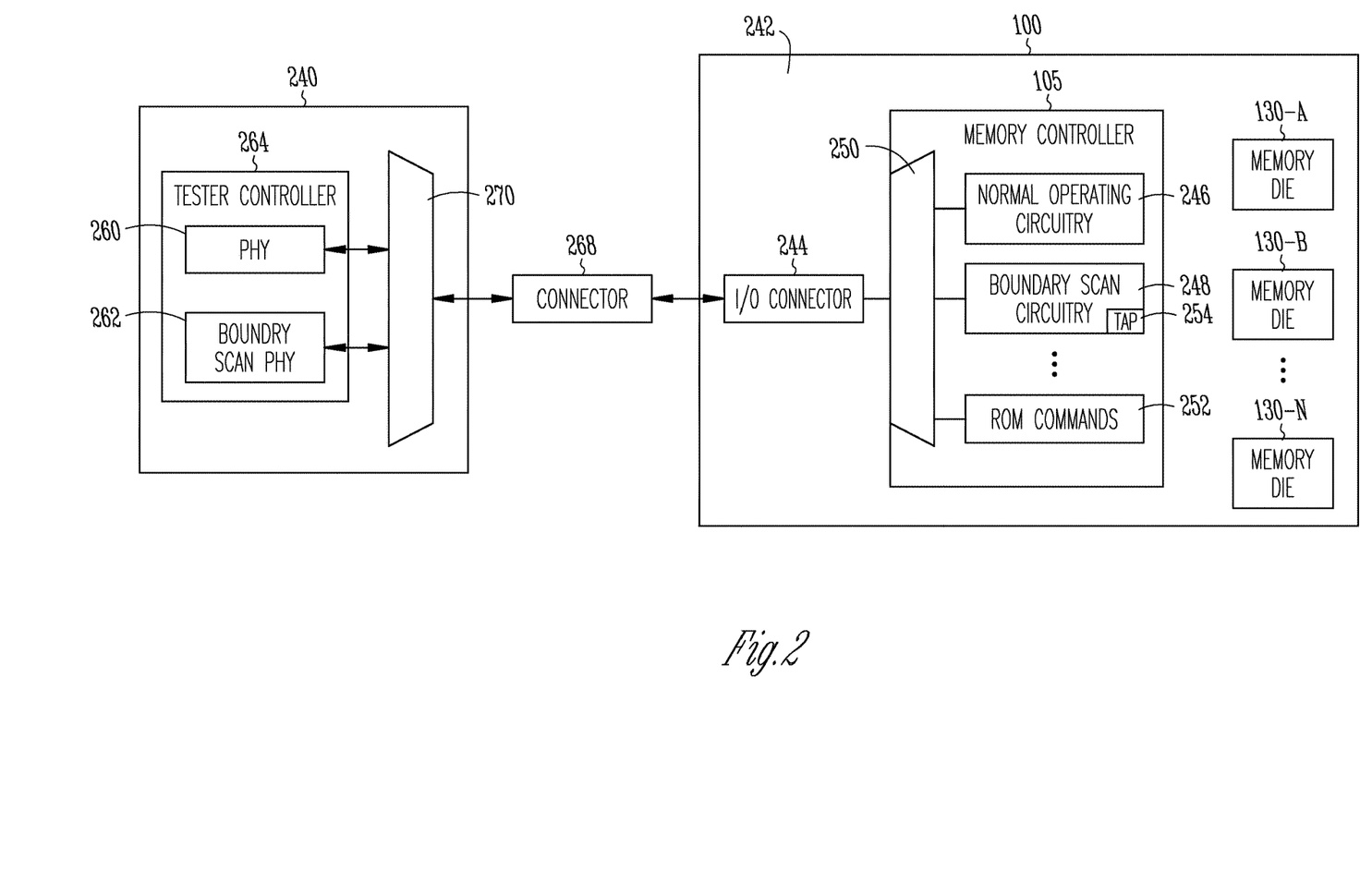
FIG. 2 is a block diagram of a memory device and Automated Test Equipment (ATE) to test the memory device according to some examples described herein.

FIG. 2 is a block diagram of a memory device 100 and Automated Test Equipment (ATE) 240 to test the memory device 100. The memory device 100 under test may be an SSD device, a PCI-SIG storage device, CXL storage device, SNIA storage device, or any memory expander device. The memory device 100 includes a memory controller 105 (e.g., a memory controller IC) and memory die (130-A, 130-B, . . . 130-N). The memory controller 105 and memory die (130-A, 130-B, . . . 130-N) are mounted on a PCB 242 and the PCB 242 includes an I/O Connector 244. The memory controller 105 may be included in an IC die separate from the memory die (130-A, 130-B, . . . 130-N).

The memory controller 105 includes normal operating circuitry 246 to perform the memory operating functions described previously herein, and the normal operating circuitry 246 can include the circuitry previously described to perform those functions in a normal operating mode. The memory controller 105 also includes boundary scan circuitry 248 to perform boundary scan operations, but the memory device 100 does not include dedicated I/O for boundary scan.

The PCB 242 and I/O connector 244 have a conventional form factor, and the I/O connector 244 does not include pins/pads dedicated to receiving boundary scan signals. Instead, to provide boundary scan test capability, a portion of the pins of the I/O connector 244 are remapped to boundary scan functionality when the memory controller 105 is placed in a boundary scan mode. For example, when the memory controller is placed in a boundary scan mode, five pins of the I/O connector can be remapped to a five pin boundary scan interface connected to the boundary scan circuitry 248.

In an illustrative example intended to be non-limiting, the memory device 100 may have an enterprise and data center standard form factor (EDSFF). An ESDFF interface includes sideband signal pins. These sideband signal pins include a three-pin system management bus (SMBus), a light emitting diode (LED) pin, and a manufacturing (MFG) mode pin. These five ESDFF pins can be remapped to a five pin boundary scan interface. Table 1 is an example of remapping the pins and the boundary scan functions of the remapped pins. The five pin boundary scan interface may include JTAG defined pins for Test Data In (TDI), Test Data Out (TDO), Test Clock (TCK), Test Reset (TRST), and Test Mode Select (TMS).

TABLE 1

| JTAG Pin | System Pin | Function |
| --- | --- | --- |
| TDI | SMBDAT | Input of Streaming Data |
| TDO | MFG | Output of Streaming Data |
| TCK | SMBCLK | Clocking |
| TRST | SMBRESET or PERST | Reset |
| TMS | LED | Mode Select |

The normal operating circuitry of the memory controller 105 can include logic to decode a command received via the I/O connector 244 to enter the boundary scan mode. In some examples, the memory controller 105 may enter the boundary scan mode in response to a signal on a pin asserted by the ATE 240. When in the boundary scan mode, the memory device 100 can include multiplexer circuitry 250 to remap the I/O connector pins to boundary scan interface pins and connect the pins to the boundary scan circuitry 248. The memory controller 105 can include ROM 252 to store one or more ROM commands.

When the processing circuitry of the memory controller 105 performs one or more of the ROM commands, it configures the memory controller for operating in the boundary scan mode, such as by remapping the I/O connector pins to boundary scan interface pins. In some examples, the boundary scan circuitry 248 includes a JTAG test access point (TAP) and the boundary scan circuitry 248 decodes JTAG commands received on the boundary scan interface pins. The normal operating mode of the memory device 100 can be the default mode. The memory device 100 may be in the default normal operating mode upon power-up of the memory device. When the memory controller 105 is in boundary scan mode, the memory controller can be returned to the normal operating mode by power cycling the memory device 100.

The ATE 240 includes first physical layer (PHY) circuitry 260, boundary scan PHY circuitry 262 and a tester controller 264. The tester controller 264 can include a processor, a field programmable gate array (FPGA), application specific integrated circuit (ASIC), etc. The tester controller 264 may use the first PHY circuitry 260 in the normal system mode to send data using the sideband signaling of the memory device. For example, the first PHY circuitry can be used to send commands and data via the SMBus pins of the I/O connector 244 to the normal operating circuitry 246 of the memory controller 105. The tester controller 264 uses the boundary scan PHY circuitry 262 to send boundary scan commands and data to the boundary scan circuitry 248 of the memory controller 105.

The ATE 240 also includes a tester connector 268 to connect to a memory device 100 under test. The tester connector 268 includes pins to connect to the I/O connector 244 of the memory device 100 under test. In some examples, the tester connector 268 is socketed, and the connector socket has a form factor that connects to an SSD device form factor, such as a U.2 form factor, a U.3 form factor, or an M.2 form factor, or an ESDFF. The ATE can include tester multiplexer circuitry 270 to multiplex one of normal signaling or boundary scan signaling onto the tester connector 268. The tester multiplexer circuitry 270 can be used to remap some of the pins of the tester connector to a boundary scan interface when the ATE performs boundary scan testing on the memory device 100.

Figure 3:
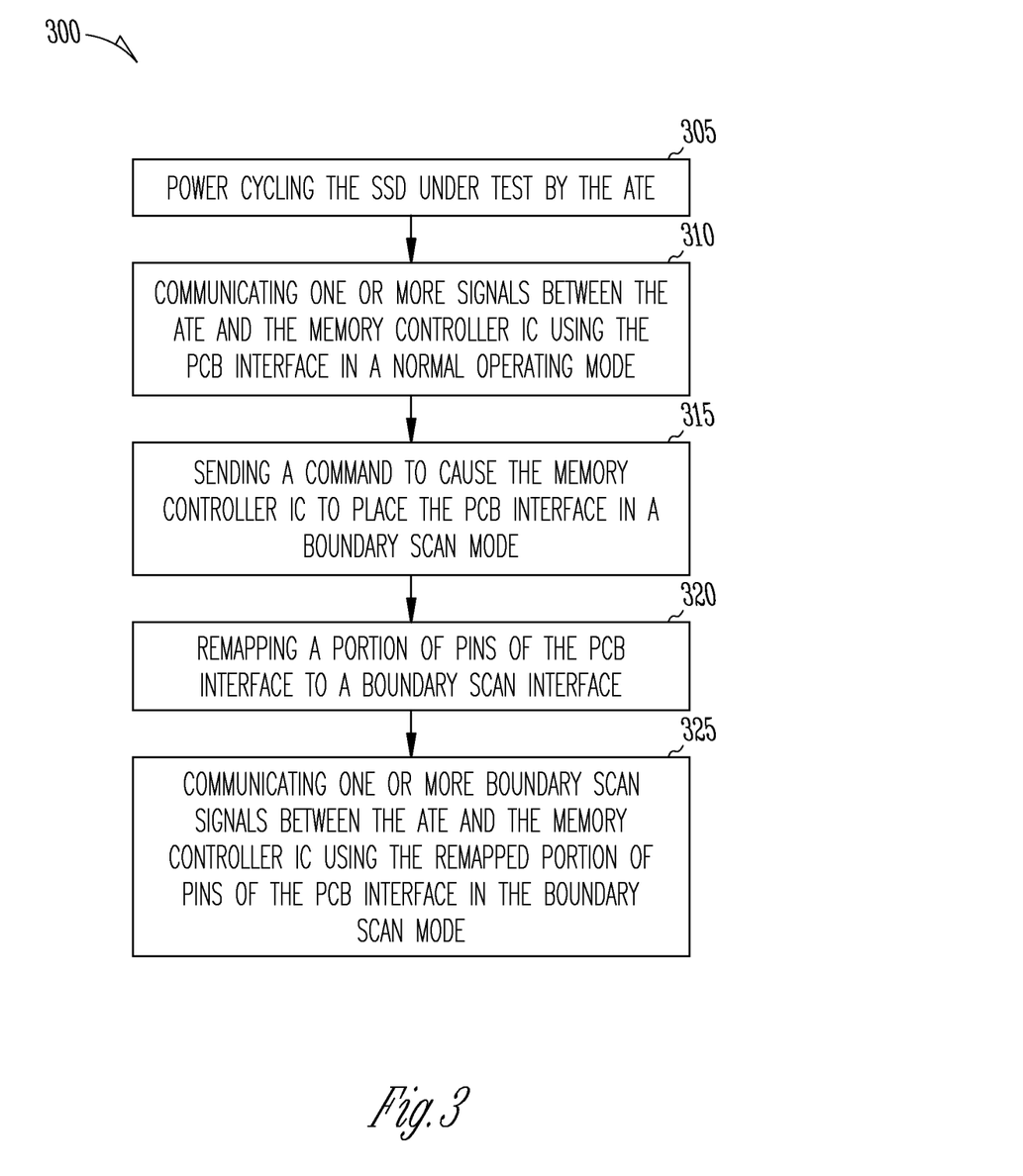
FIG. 3 is a flow diagram of a method performed by ATE to test a memory device according to some examples described herein.

FIG. 3 is a flow diagram of a method 300 performed by ATE (such as the ATE of FIG. 2) to test a memory device 100 that is an SSD. The SSD device under test includes a memory controller IC attached to a PCB 242. The PCB 242 includes a PCB interface such as I/O connector 244 in FIG. 2.

At block 305, the ATE power cycles the SSD under test. This places the SSD and ATE in a normal system mode. In the normal system mode, the normal operating circuitry of the memory controller 105 of the SSD is connected to the pins of the I/O connector 244. At block 310, signals may be communicated between the PHY circuitry 260 of the ATE and the normal operating circuitry 246 of the memory controller 105 in the normal system mode using the PCB interface.

At block 315 of FIG. 3, the tester controller 264 of the ATE 240 sends a command to cause the memory controller 105 to enter a boundary scan mode such as a JTAG mode. At block 320, a portion of pins of the PCB interface are remapped or reassigned to a boundary scan interface in the boundary scan mode. This remapping includes the memory controller 105 connecting the remapped portions of the pins of the PCB interface to the boundary scan circuitry 248 of the memory controller and may include disconnecting the pins from the normal operating circuitry 246 using the multiplexer 250. This remapping also includes the tester controller 264 configuring the tester multiplexer circuitry 270 to send data from the boundary scan PHY circuitry 262 to the tester connector 268.

At block 325, one or more boundary scan signals are communicated between the ATE and the memory controller IC using the remapped portion of pins of the PCB interface in the boundary scan mode. The boundary scan signals can be commands and data sent by the tester controller 264 to perform boundary scan testing on I/O of the memory controller 105, including the host interface and the memory die interface. Power cycling the SSD returns the SSD to the default normal system mode.

Figure 4:
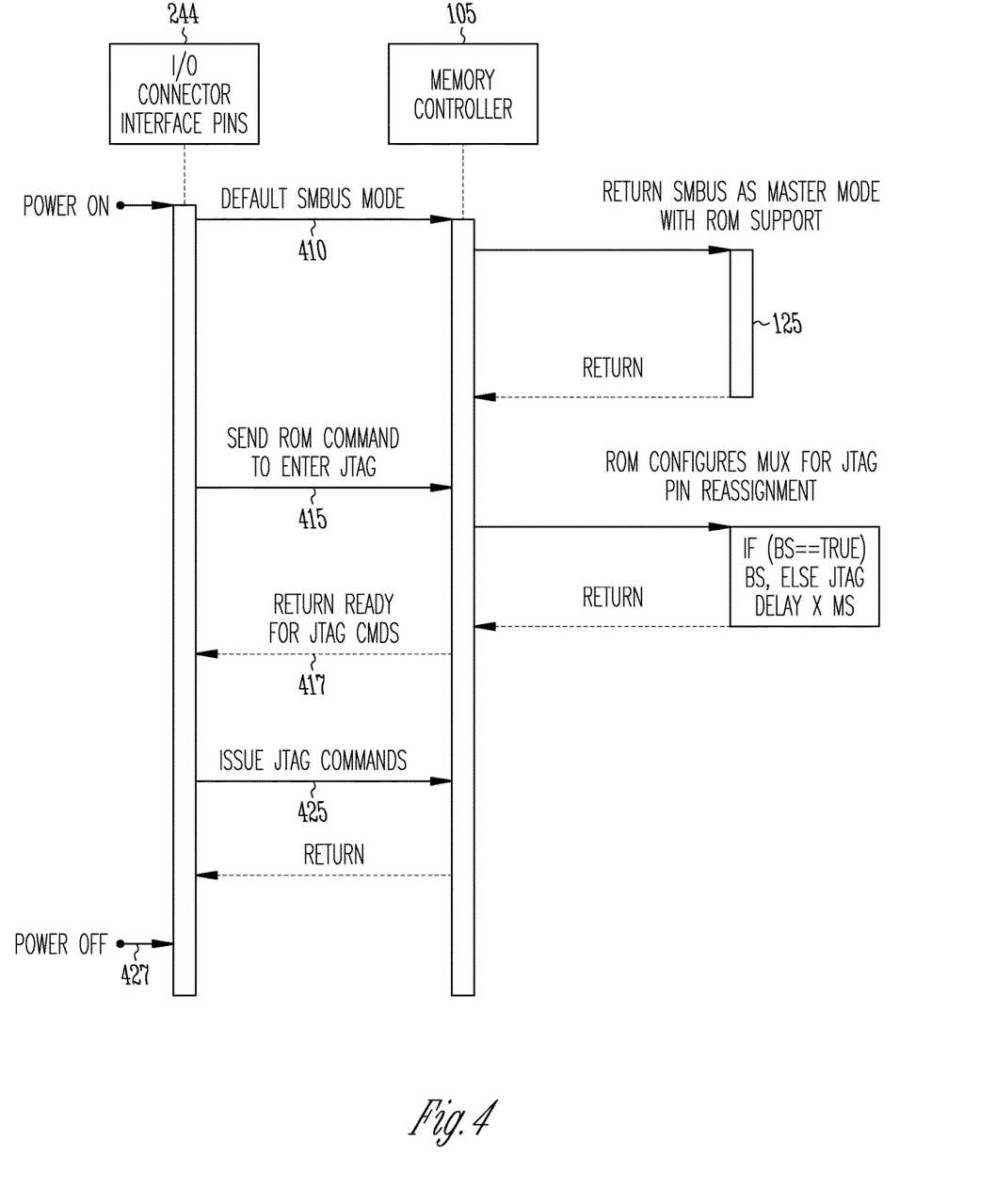
FIG. 4 is a diagram illustrating an example of the flow of data and commands between ATE and a memory device under test according to some examples described herein.

FIG. 4 is a diagram showing an example of the flow of data and commands between the Interface Pins of the I/O connector 244 and the memory controller 105 for the method example of FIG. 3. Upon power-up, the memory controller 105 is in the default normal system mode. The ATE 240 may send data and commands on the SMBus of the Interface Pins to the memory controller 105 in an SMBus mode 410. The commands may cause the memory controller 105 to communicate data to a memory die using the memory die interface 125. Commands may be included in the ROM 252 to support the memory operations. The results of the communication between the memory controller 105 and memory die can be sent back to the ATE 240.

The example in FIG. 4 shows a command 415 being sent from the Interface Pins to the ROM 252 of the memory controller 105 that triggers the memory controller 105 to enter JTAG mode. The processing circuitry of the memory controller 105 executes one or more ROM commands to place the memory controller in a 'JTAG-like' mode with JTAG pin reassignments at the Interface Pins. The memory controller 105 sends back an indication that it is in the JTAG mode and ready for JTAG commands.

A delay is then timed (e.g., a 100 millisecond time window) to allow the memory controller 105 to configure itself to the JTGA mode to operate under 5-wire JTAG operation for boundary scan; including configuring a portion of its interface to JTAG pin reassignments. The tester controller 264 may wait for the appropriate delay before beginning the boundary scan operation or the tester controller 264 may wait for data 417 to be returned on the JTAG interface (e.g., the MFG pin) indicating that the memory controller 105 has positively entered the mode before beginning the boundary scan operation can commence.

The boundary scan operation includes the ATE 240 issuing JTAG commands 425 and 'streaming' a boundary scan file to the memory device 100. The boundary scan file can include a scan vector to setup/control the pins of the I/O connector 244 of the memory device remapped to the JTAG I/O such as by reassigning the pins listed in Table 1 reserved for the purpose of executing boundary scan testing only when in the JTAG-like mode. The generation of the boundary scan file can include scan vectors to test all devices that can be attached to the boundary scan circuitry of the memory device under test. The tester controller 264 verifies the scan data returned is the expected data from the scan file. To exit the boundary scan mode, a power cycle 427 can be issued to revert to the normal system mode.

The systems, devices, and methods described herein provide for boundary scan testing of memory devices having a form factor that does not support boundary scan testing techniques such as JTAG testing. Typically, testing for such devices is limited to automated optical inspection, but optical inspection does not uncover issues such as poor resistive connections due to cold solder attach, a ball grid array missing solder, mild tombstoning of components, and narrowed PCB traces, etc. Providing the boundary scan testing will allow electrical testing to uncover these issues.

Figure 5:
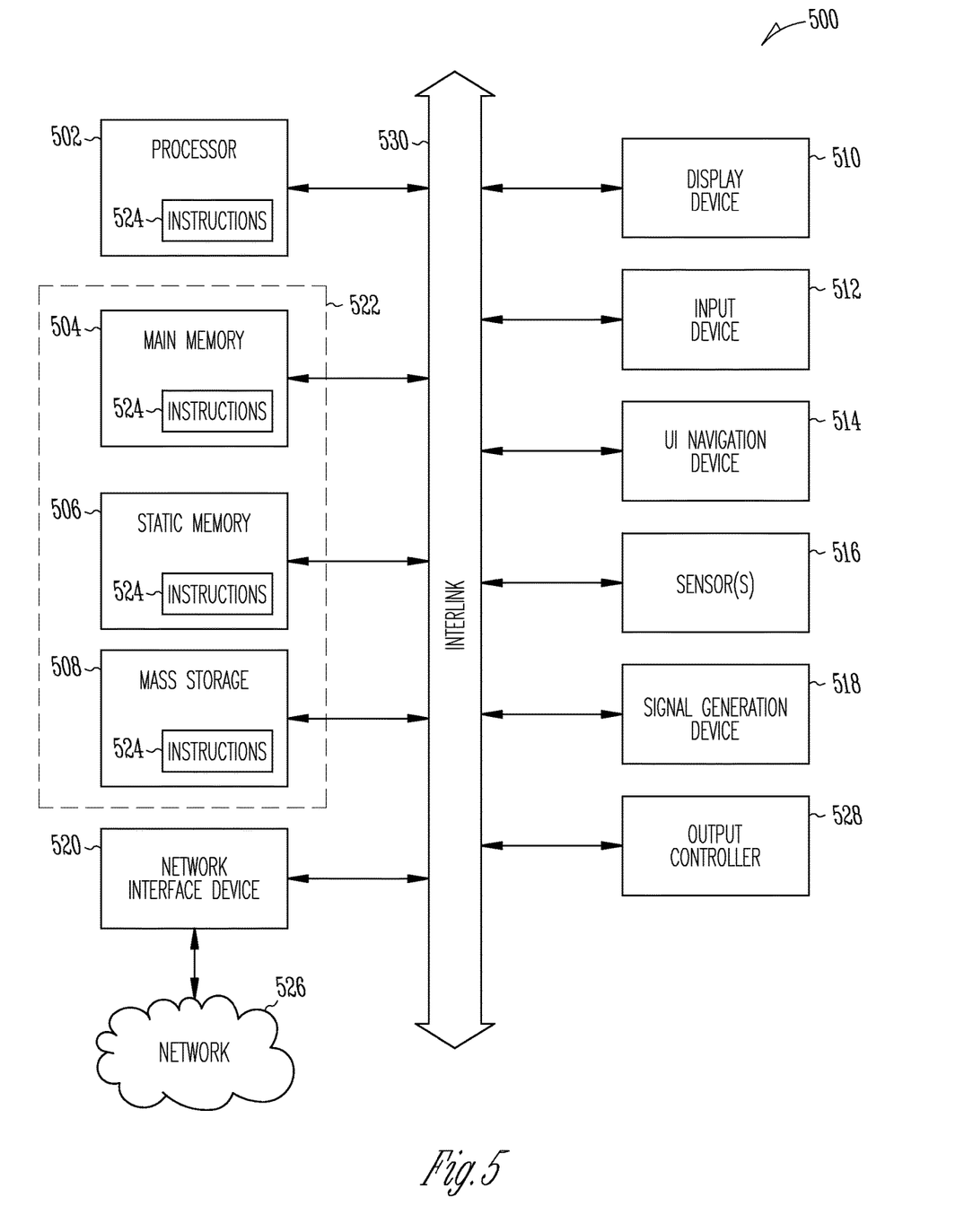
FIG. 5 illustrates a block diagram of an example machine according to some examples described herein.

FIG. 5 illustrates a block diagram of an example machine 500 upon which any one or more of the techniques (e.g., methodologies) described herein may be performed. Examples, as described herein, may include, or may operate by, logic or a number of components, or mechanisms in the machine 500. Circuitry (e.g., processing circuitry) is a collection of circuits implemented in tangible entities of the machine 500 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired).

In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 500 follow.

In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 500 may include a hardware processor 502 (e.g., a central processing unit (CPU), a graphics processing unit (GPU), a hardware processor core, or any combination thereof), a main memory 504, a static memory (e.g., memory or storage for firmware, microcode, a basic-input-output (BIOS), unified extensible firmware interface (UEFI), etc.) 506, and mass storage 508 (e.g., hard drives, tape drives, flash storage, or other block devices) some or all of which may communicate with each other via an interlink (e.g., bus) 530. One or both of the main memory and the static memory can include one or more SSD storage devices, PCI-SIG type storage devices, or SNIA type storage devices. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 508, a signal generation device 518 (e.g., a speaker), a network interface device 520, and one or more sensors 516, such as a global positioning system (GPS) sensor, compass, accelerometer, or other sensor. The machine 500 may include an output controller

528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 502, the main memory 504, the static memory 506, or the mass storage 508 may be, or include, a machine readable medium 522 on which is stored one or more sets of data structures or instructions 524 (e.g., software) embodying or utilized by any one or more of the techniques or functions described herein. The instructions 524 may also reside, completely or at least partially, within any of registers of the processor 502, the main memory 504, the static memory 506, or the mass storage 508 during execution thereof by the machine 500. In an example, one or any combination of the hardware processor 502, the main memory 504, the static memory 506, or the mass storage 508 may constitute the machine-readable media 522. While the machine-readable medium 522 is illustrated as a single medium, the term "machine readable medium" may include a single medium or multiple media (e.g., a centralized or distributed database, and/or associated caches and servers) configured to store the one or more instructions 524.

The term "machine-readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 522 may be representative of the instructions 524, such as instructions 524 themselves or a format from which the instructions 524 may be derived. This format from which the instructions 524 may be derived may include source code, encoded instructions (e.g., in compressed or encrypted form), packaged instructions (e.g., split into multiple packages), or the like. The information representative of the instructions 524 in the machine readable medium 522 may be processed by processing circuitry into the instructions to implement any of the operations discussed herein. For example, deriving the instructions 524 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 524.

In an example, the derivation of the instructions 524 may include assembly, compilation, or interpretation of the information (e.g., by the processing circuitry) to create the instructions 524 from some intermediate or preprocessed format provided by the machine readable medium 522. The information, when provided in multiple parts, may be combined, unpacked, and modified to create the instructions 524. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 524 may be further transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software. A transmission medium is a machine readable medium.

In the foregoing specification, some example implementations of the disclosure have been described. It will be evident that various modifications can be made thereto without departing from the broader scope and spirit of the disclosure as set forth in the following claims. The specification and drawings are, accordingly, to be regarded in an illustrative sense rather than in a restrictive sense. Below is a non-exhaustive list of examples of implementations of the present disclosure.

Example 1 includes subject matter (such as a method performed by ATE) comprising power cycling a solid state drive (SSD) device under test by the ATE, wherein the SSD device includes a memory controller integrated circuit (IC) attached to a printed circuit board (PCB) having a PCB interface; communicating one or more signals between the ATE and the memory controller IC using the PCB interface in a normal system mode; sending, by the ATE, a command to cause the memory controller IC to place the PCB interface in a boundary scan mode; remapping a portion of pins of the PCB interface to a boundary scan interface; and communicating one or more boundary scan signals between the ATE and the memory controller IC using the remapped portion of pins of the PCB interface in the boundary scan mode.

In Example 2, the subject matter of Example 1 optionally includes remapping pins of an SMBus interface of the PCB interface to the boundary scan interface.

In Example 3, the subject matter of one or both Examples 1 and 2 optionally includes the ATE sending a signal to the memory controller IC to trigger logic circuitry of the memory controller IC to perform one or more commands included in read only memory (ROM) of the memory controller IC.

In Example 4, the subject matter of one or any combination of Examples 1-3 optionally includes the ATE sending a command to place the PCB interface in a Joint Test Action Group (JTAG) scan mode, and the ATE sending one or more JTAG commands.

In Example 5, the subject matter of one or any combination of Examples 1-4 optionally includes the memory controller asserting a signal on the remapped portion of the pins of the PCB interface that the memory controller has entered the boundary scan mode.

In Example 6, the subject matter of one or any combination of Examples 1-5 optionally includes power cycling the SSD to return the PCB interface to the normal system mode.

In Example 7, the subject matter of one or any combination of Examples 1-6 optionally includes remapping five pins of the PCB interface to a five pin boundary scan interface in the boundary scan mode.

In Example 8, the subject matter of one or any combination of Examples 1-7 optionally includes communicating the one or more signals using sideband signal pins of an enterprise and data center standard form factor (EDSFF) interface in the normal operating mode; and remapping the sideband signal pins of the EDSFF interface that include a three-pin system management bus (SMBus), a light emitting diode (LED) pin, and a manufacturing (MFG) mode pin to the boundary scan interface in the boundary scan mode.

In Example 9, the subject matter of one or any combination of Examples 1-8 optionally includes receiving a memory controller command via the portion of the pins of the PCB interface in the normal system mode; and receiving one or more scan vectors via the portion of the pins of the PCB interface in the boundary scan mode.

Example 10 includes subject matter (such as a memory storage without dedicated input-output (I/O) for boundary scan) or can optionally be combined with one or any combination of Examples 1-9 to include such subject matter, comprising a printed circuit board (PCB), an I/O connector, and a memory controller IC. The memory controller includes first circuitry to receive normal operating signals on first pins of the I/O connector when the memory controller is in a normal operating mode, and boundary scan circuitry to receive one or more boundary scan signals on the same first pins of the I/O connector when the memory controller is in a boundary scan mode.

In Example 11, the subject matter of Example 10 optionally includes the first pins of the I/O connector including pins of a system management bus (SMBus) interface of the I/O connector.

In Example 12, the subject matter of one or both of Examples 10 and 11 optionally includes a memory controller IC including logic circuitry configured to decode a command received via the I/O connector to enter the boundary scan mode; and connect the first pins to the boundary scan circuitry in response to receiving the command.

In Example 13, the subject matter of Example 12 optionally includes processing circuitry including at least one hardware processor; and read only memory (ROM) to store at least one ROM command that, when performed by the processing circuitry, configures the memory controller IC for operation in the boundary scan mode.

In Example 14, the subject matter of one or both of Examples 12 and 13 optionally includes the normal operating mode being a default mode of the memory controller, and the logic circuitry is configured to set the memory controller IC to operate in the normal operating made when power cycling the memory controller IC in the boundary scan mode.

In Example 15, the subject matter of one or any combination of Examples 12-15 optionally includes logic circuitry configured to connect five pins of the I/O connector to the boundary scan circuitry as a five pin boundary scan interface in the boundary scan mode.

In Example 16, the subject matter of one or any combination of Examples 10-15 optionally includes the PCB having an enterprise and data center standard form factor (EDSFF), and the I/O connector includes an EDSFF interface, and the memory controller IC including logic circuitry to connect sideband signal pins of the EDSFF interface that include a three-pin system management bus (SMBus), a light emitting diode (LED) pin, and a manufacturing (MFG) mode pin to the boundary scan circuitry in the boundary scan mode.

In Example 17, the subject matter of one or any combination of Examples 10-16 optionally includes the memory device being a solid state disk (SSD) memory device and the PCB having one of a U.2, U.3, or M.2 form factor.

In Example 18, the subject matter of Example 17 optionally includes the boundary scan circuitry includes a Joint Test Action Group (JTAG) test access point (TAP), and the boundary scan circuitry is configured to decode a JTAG command received on the first pins of the I/O connector.

Example 19 includes subject matter (such as automated test equipment (ATE) to test a solid state drive (SSD) device) or can optionally be combined with one or any combination of Examples 1-18 to include such subject matter, comprising first physical layer (PHY) circuitry and boundary scan PHY circuitry; a test connector having pins to connect to a solid state disk (SSD) device under test; multiplexer circuitry connected to the first PHY circuitry, the boundary scan PHY circuitry, and the test connector; and a tester controller connected to the first PHY circuitry and the boundary scan PHY circuitry. The tester controller is configured to communicate one or more signals from the first PHY circuitry to the SSD device under test in a normal mode using first pins of the test connector; communicate, using the test connector, a command to the SSD device under test to enter a boundary scan mode; and communicate one or more boundary scan commands from the boundary scan PHY circuitry to the SSD device under test in the boundary scan mode using the same first pins of the test connector.

In Example 20, the subject matter of claim 19 optionally includes the test connector including a socket having one of an enterprise and data center standard form factor (EDSFF), a U.2 form factor, a U.3 form factor, or an M.2 form factor.

These non-limiting Examples can be combined in any permutation or combination.

What is claimed is:
1. A method performed by automated test equipment (ATE), the method comprising:
power cycling a solid state drive (SSD) device under test by the ATE, wherein the SSD device includes a memory controller integrated circuit (IC) attached to a printed circuit board (PCB) having a PCB interface;

communicating one or more signals between the ATE and the memory controller IC using the PCB interface in a normal system mode;

sending, by the ATE, a command to cause the memory controller IC to place the PCB interface in a boundary scan mode;

remapping a portion of pins of the PCB interface to a boundary scan interface; and communicating one or more boundary scan signals between the ATE and the memory controller IC using the remapped portion of pins of the PCB interface in the boundary scan mode.

2. The method of claim 1, wherein remapping a portion of pins of the PCB interface includes remapping pins of an SMBus interface of the PCB interface to the boundary scan interface.

3. The method of claim 1, wherein the sending a command by the ATE includes the ATE sending a signal to the memory controller IC to trigger logic circuitry of the memory controller IC to perform one or more commands included in read only memory (ROM) of the memory controller IC.

4. The method of claim 1, including the ATE sending a command to place the PCB interface in a Joint Test Action Group (JTAG) scan mode, and the ATE sending one or more JTAG commands.

5. The method of claim 1, including the memory controller asserting a signal on the remapped portion of the pins of the PCB interface that the memory controller has entered the boundary scan mode.

6. The method of claim 1, including power cycling the SSD to return the PCB interface to the normal system mode.

7. The method of claim 1, wherein remapping a portion of pins of the PCB interface includes remapping five pins of the PCB interface to a five pin boundary scan interface in the boundary scan mode.

8. The method of claim 1,
wherein the communicating one or more signals includes communicating the one or more signals using sideband signal pins of an enterprise and data center standard form factor (EDSFF) interface in the normal operating mode; and
wherein remapping a portion of pins of the PCB interface includes remapping the sideband signal pins of the EDSFF interface that include a three-pin system management bus (SMBus), a light emitting diode (LED) pin, and a manufacturing (MFG) mode pin to the boundary scan interface in the boundary scan mode.

9. The method of claim 1, including:
receiving a memory controller command via the portion of the pins of the PCB interface in the normal system mode; and
receiving one or more scan vectors via the portion of the pins of the PCB interface in the boundary scan mode.

10. A memory device without dedicated input-output (I/O) for boundary scan, the device comprising:
a printed circuit board (PCB);
an input-output (I/O) connector; and
a memory controller integrated circuit (IC) mounted on the (PCB) and connected to the I/O connector, wherein the memory controller IC includes:
first circuitry to receive normal operating signals on first pins of the I/O connector when the memory controller is in a normal operating mode; and
boundary scan circuitry to receive one or more boundary scan signals on the same first pins of the I/O connector when the memory controller is in a boundary scan mode.

11. The device of claim 10, wherein the first pins of the I/O connector include pins of a system management bus (SMBus) interface of the I/O connector.

12. The device of claim 10, wherein the memory controller IC includes logic circuitry configured to:
decode a command received via the I/O connector to enter the boundary scan mode; and
connect the first pins to the boundary scan circuitry in response to receiving the command.

13. The device of claim 12, including:
processing circuitry including at least one hardware processor; and
read only memory (ROM) to store at least one ROM command that, when performed by the processing circuitry, configures the memory controller IC for operation in the boundary scan mode.

14. The device of claim 12, wherein the normal operating mode is a default mode of the memory controller IC, and the logic circuitry is configured to set the memory controller IC to operate in the normal operating made when power cycling the memory controller IC in the boundary scan mode.

15. The device of claim 12, wherein the logic circuitry is configured to connect five pins of the I/O connector to the boundary scan circuitry as a five pin boundary scan interface in the boundary scan mode.

16. The device of claim 10,
wherein the PCB has an enterprise and data center standard form factor (EDSFF), and the I/O connector includes an EDSFF interface; and
wherein the memory controller IC includes logic circuitry to connect sideband signal pins of the EDSFF interface that include a three-pin system management bus (SMBus), a light emitting diode (LED) pin, and a manufacturing (MFG) mode pin to the boundary scan circuitry in the boundary scan mode.

17. The device of claim 10, wherein memory device is a solid state disk memory device, and the PCB has one of a U.2, U.3, or M.2 form factor.

18. The device of claim 17, wherein the boundary scan circuitry includes a Joint Test Action Group (JTAG) test access point (TAP), and the boundary scan circuitry is configured to decode a JTAG command received on the first pins of the I/O connector.

19. Automated test equipment (ATE) to test a solid state drive (SSD) device, the ATE comprising:
first physical layer (PHY) circuitry and boundary scan PHY circuitry;
a test connector having pins to connect to a solid state disk (SSD) device under test;
multiplexer circuitry connected to the first PHY circuitry, the boundary scan PHY circuitry, and the test connector; and
a tester controller connected to the first PHY circuitry and the boundary scan PHY circuitry, and configured to:
communicate one or more signals from the first PHY circuitry to the SSD device under test in a normal mode using first pins of the test connector,
communicate, using the test connector, a command to the SSD device under test to enter a boundary scan mode; and
communicate one or more boundary scan commands from the boundary scan PHY circuitry to the SSD device under test in the boundary scan mode using the same first pins of the test connector.

20. The ATE of claim 19, wherein the test connector includes a socket having one of an enterprise and data center standard form factor (EDSFF), a U.2 form factor, a U.3 form factor, or an M.2 form factor.

* * * * *